(12) United States Patent
Oget et al.

(10) Patent No.: US 7,581,242 B1
(45) Date of Patent: Aug. 25, 2009

(54) AUTHENTICATING PRODUCTS

(75) Inventors: Guillaume Oget, Santa Clara, CA (US);
Steven J. Simske, Fort Collins, CO (US); Jorge Badillo, Rincon, PR (US); Bill Serra, Montara, CA (US); Cyril Brignone, Mountain View, CA (US); Malena Mesarina, Mountain View, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 779 days.

(21) Appl. No.: 11/117,797

(22) Filed: Apr. 30, 2005

(51) Int. Cl.
*G06K 5/00* (2006.01)
*H04K 1/00* (2006.01)
*H04L 9/32* (2006.01)
*G06F 7/04* (2006.01)
*A63F 13/12* (2006.01)
*H04M 11/00* (2006.01)
*H04Q 9/00* (2006.01)

(52) U.S. Cl. ............................. 726/2; 726/16; 713/179; 705/50; 235/380

(58) Field of Classification Search .................... 726/16
See application file for complete search history.

(56) References Cited

U.S. PATENT DOCUMENTS

2005/0289083 A1* 12/2005 Ngai et al. ..................... 705/67
2006/0168644 A1* 7/2006 Richter et al. .................. 726/2

FOREIGN PATENT DOCUMENTS

WO       WO 9807485 A2 *   2/1998

OTHER PUBLICATIONS

R. Braumandl, M. Keidl, A. Kemper, D. Kossmann, A. Kreutz, S. Seltzsam, K. Stocker, "ObjectGlobe: Ubiquitous query processing on the Internet", Aug. 2001 The VLDB Journal—The International Journal on Very Large Data Bases, vol. 10 Issue 1, pp. 49-71.*

* cited by examiner

*Primary Examiner*—Matthew B Smithers
*Assistant Examiner*—Courtney D Fields

(57) ABSTRACT

A method of authenticating products includes receiving a description of detectable features read from a package. The package includes two or more detectable features, and the detectable features are affixed on the package based on encoded information. Authentication information is provided based on a comparison of the received description to one or more stored package identifiers.

20 Claims, 7 Drawing Sheets

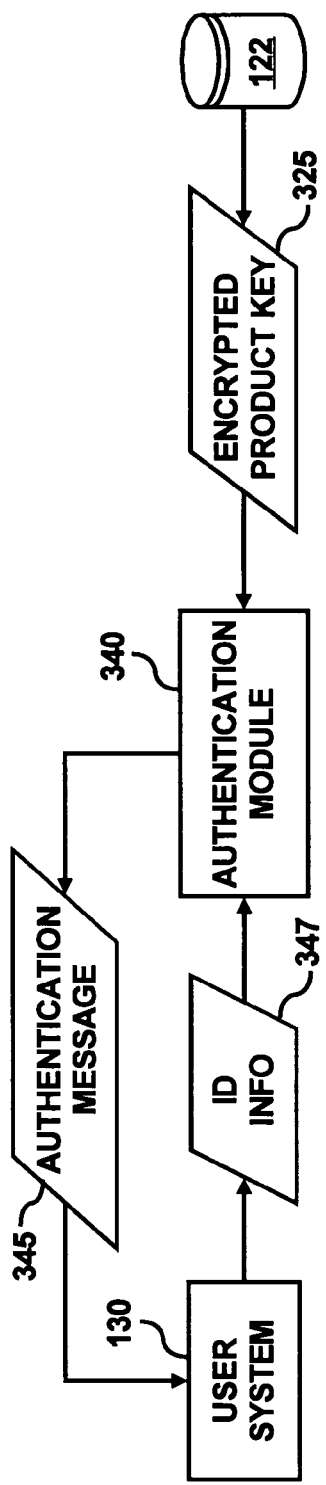
FIG. 3B
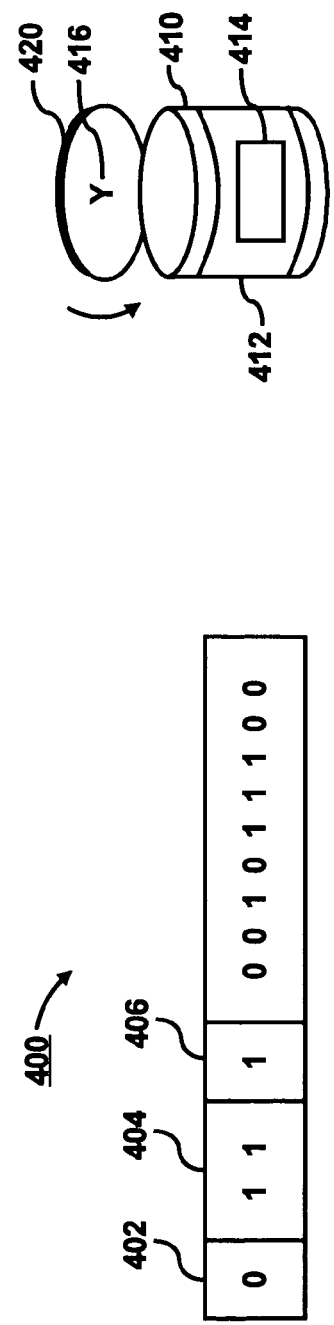
FIG. 4B
FIG. 4A

AUTHENTICATING PRODUCTS

BACKGROUND

Products sold to customers are often sent through a series of intermediate points between the original source, such as a manufacturer, and the customers, who may buy the products from a retailer. Products may include food items, pharmaceutical drugs or other products, including products of manufacture. These products may be sold to a customer through a grocery store, a pharmacy, a department store or other type of retailer.

Counterfeited products may enter the supply chain to the customer at any number of different points in the supply chain. For example, a wholesaler may receive counterfeit goods which it passes on to a retailer, or directly to the customer.

Because of the possibility of spoofing, wherein a counterfeiter copies the packaging of the product, manufacturers attempt to prevent entry of counterfeit products into the marketplace by protecting the packages. Manufacturers can make it difficult for counterfeiters to copy or spoof the packaging on their products. Some approaches that manufacturers have used include using holograms or three dimensional printing on packages. For example, a hologram of a company's logo is placed on a package so a customer buying the product knows that the product is from the company and is not counterfeit. These approaches provide some deterrence. However, counterfeiting (due to its high margin and willingness of some counterfeiters to "invest" in new technologies) has become very sophisticated so that it is has become difficult for manufacturers to provide product packaging that cannot be replicated by counterfeiters of the product.

SUMMARY OF THE INVENTION

A process for authenticating products is described. A description of detectable features read from a package is received. The package includes two or more detectable features, and the detectable features are affixed on the package based on encoded information. Authentication information is provided based on a comparison of the received description to one or more stored package identifiers.

BRIEF DESCRIPTION OF THE DRAWINGS

Features of the present invention will become apparent to those skilled in the art from the following description with reference to the figures, in which:

FIG. 3B illustrates data flow of authentication user system.

FIG. 4A illustrates an example of a package identifier.

FIG. 4B illustrates an example of a package including detectable features.

DETAILED DESCRIPTION OF THE INVENTION

For simplicity and illustrative purposes, the principles of the embodiments are described by referring mainly to examples thereof. In the following description, numerous specific details are set forth in order to provide a thorough understanding of the embodiments. It will be apparent however, to one of ordinary skill in the art, that the embodiments may be practiced without limitation to these specific details. In other instances, well known methods and structures have not been described in detail so as not to unnecessarily obscure the embodiments.

A system for authenticating packages is described. Identification information may be encoded and affixed to the package as detectable features. As used in this specification, "package" may refer to an individual container, a carton or a pallet or any type of receptacle for products on which identification information may be stored.

The term "affixed" to the package refers to anything that is integral to package in some way. For example, each detectable feature may be embedded within or on the surface of the package. The detectable feature may also be permanently or semi-permanently attached to the package during manufacture or shortly thereafter using adhesive or mechanical methods. The detectable feature may also be printed on the package.

The term "detectable" feature includes any feature that is overt, visible, observable or viewable by the unaided human senses, or using some type of reader. For example, a detectable feature may include a feature that is observable by the human eye, a feature that is sensed through touch, such as Braille, or a feature that is detected by a device, such as a scanner, barcode reader, or a RFID tag reader.

In one embodiment, a user may authenticate a package by providing a description of detectable features of a package to a server system. The server system may compare the received description to descriptions stored in a database at the server system or at a database connected to the server system. If the received description matches a description stored in the database, the server system sends a message to the user indicating that the package is authentic. If the received description does not match any of the descriptions stored in the database, the server system sends a message to the user indicating that the package is not authentic.

Figure 1:
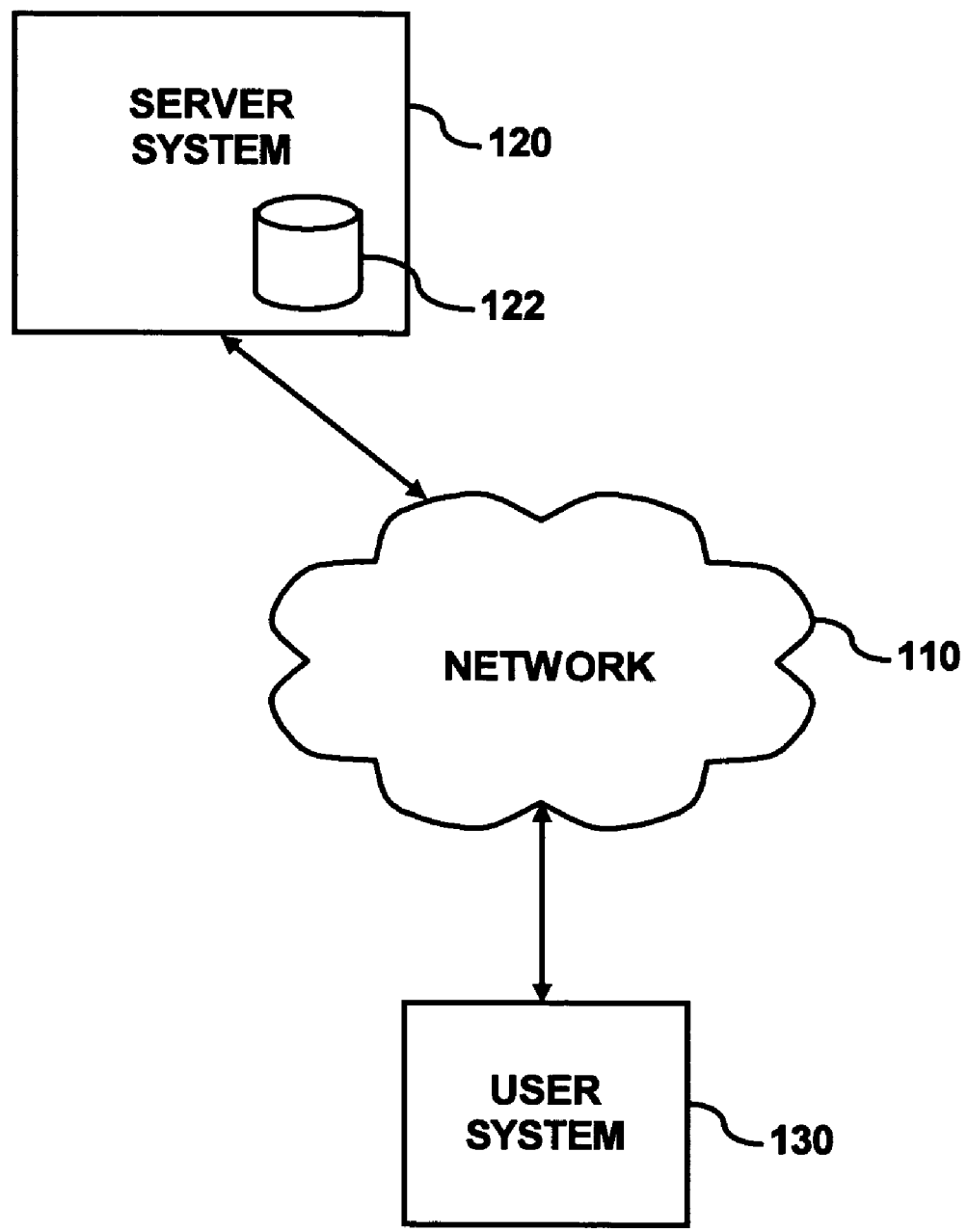
FIG. 1 illustrates an example of an authentication system.

FIG. 1 illustrates a simplified example of a system 100 through which packaging of a product may be authenticated. The system 100 may include a network 110, a server system 120 and a user system 130. The server system 120 and the user system 130 may include any type of computer system, such as the computer system described with reference to FIG. 7. The server system 120 may include a network interface including software and/or hardware, serving software (not shown) for communicating with other systems connected to the server system 120 through the network 110. The server system 120 may also include a database 122 storing information with which the server system 120 may authenticate packages. The network 110 may include any type of network, including a LAN, a WAN, the Internet, etc.

In the system 100, a user system 130 may send package information regarding features of a package to be authenticated to a server system 120 via the network 110. The package information may be input into the user system 120 by using some type of a reader, manually typing information, etc. A reader may include any type of a reader for reading information, including any type of scanner (such as a bar code scanner), a radio frequency identification ("RFID") tag reader, etc.

The user system 130 may submit the package information to the server system 120 through a website administered by the server system 120. The server system 120 compares the received information to information stored in a database 122. The server system 120 transmits a message indicating that the package is authentic or informing the user system 130 that the package may not be authentic via the network 110. The message transmitted by the server system 120 may include a message sent to the user's browser or an email or other type of message.

Figure 2:
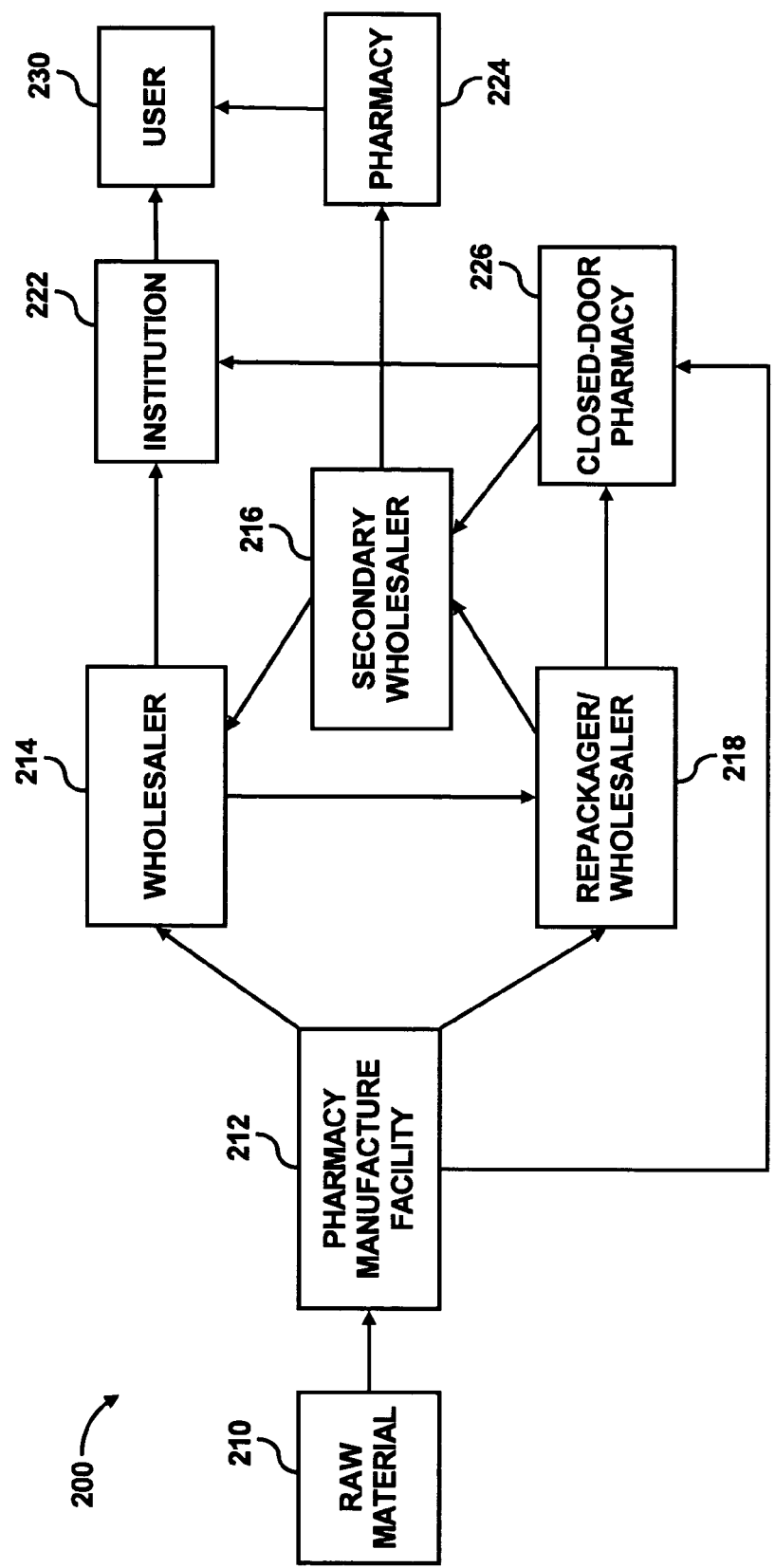
FIG. 2 illustrates an example of a supply chain in which an authentication system may be used.

The system 100 may be used to authenticate any type of product at any point of a supply chain, from the manufacturer to the customer. As an example, FIG. 2 illustrates a pharmaceutical supply chain and use of the authentication system in FIG. 1 in the pharmaceutical supply chain. It will be apparent that the authentication system can be used in supply chains for many product types.

FIG. 2 illustrates a simplified example of a supply chain 200 for the sale of pharmaceutical ("pharma") products. As shown in FIG. 2, raw materials 210 are received by a pharma manufacturing facility ("PMF") 212. The PMF 212 sends the manufactured pharma products to a wholesaler 214 or a repackager/wholesaler 218. The wholesaler 214 may sell the pharma products to institutions 222, such as hospitals, nursing homes or hospices, or pharmacies 224, which sell the pharma products to individual users 230. The wholesaler 214 may also send some of its received pharma products to the repackager/wholesaler 218.

The repackager/wholesaler 218 may sell the pharma products to closed-door pharmacies 226. The closed-door pharmacies 226 sell the pharma products to institutions 222, such as hospitals, nursing homes or hospices. The PMF 212 may also directly provide pharma products to the closed-door pharmacies 226.

Problems with counterfeit goods may arise within a network of secondary wholesalers 216. Some of the pharma products received by the repackager/wholesalers 218 or closed-door pharmacies 226 may end up at the secondary wholesalers 216, who may sell the pharma products at highly discounted prices to pharmacies 224. The secondary wholesalers 216 may sell some of the pharma products to the wholesalers 214.

Due to the number of entities handling the pharma products as they progress through the supply chain, pharmacies 224 and institutions 222 may receive counterfeit pharma products. For example, secondary wholesalers 216 may receive counterfeit products, which the secondary wholesalers 217 may sell to pharmacies 224 or wholesalers 214, introducing the counterfeit products into the supply chain. Counterfeit pharma products may include pharma products that have been reimported into the country from abroad [also known as "diversion"], pharma products that have expired (but the expiry dates have been changed on the packaging), or pharma products not manufactured by the PMF 212 that are packaged in packaging designed to spoof the packaging of actual pharma products. Other examples include packages on which the marking indicating the concentration/amount of active reagent has been altered, or counterfeit materiel that is placed in previous opened but restored packaging.

The authentication system 100 in FIG. 1 may be used in the supply chain 200 to authenticate pharma products produced by the PMF 212. The server system 120 used to authenticate the pharma products may be administered by the PMF 212 or administered by an agent of the PMF 212. The user system 130 may be located at any of the other locations in the supply chain 200, including the institution 222, the pharmacies 224, closed-door pharmacies 226, the wholesaler(s) 214, repackager/wholesaler(s) 218, secondary wholesaler(s) 216, or individual user 230. Also, the user system 130 may be located at any point outside of the supply chain where authentication is desired.

Figure 3A:
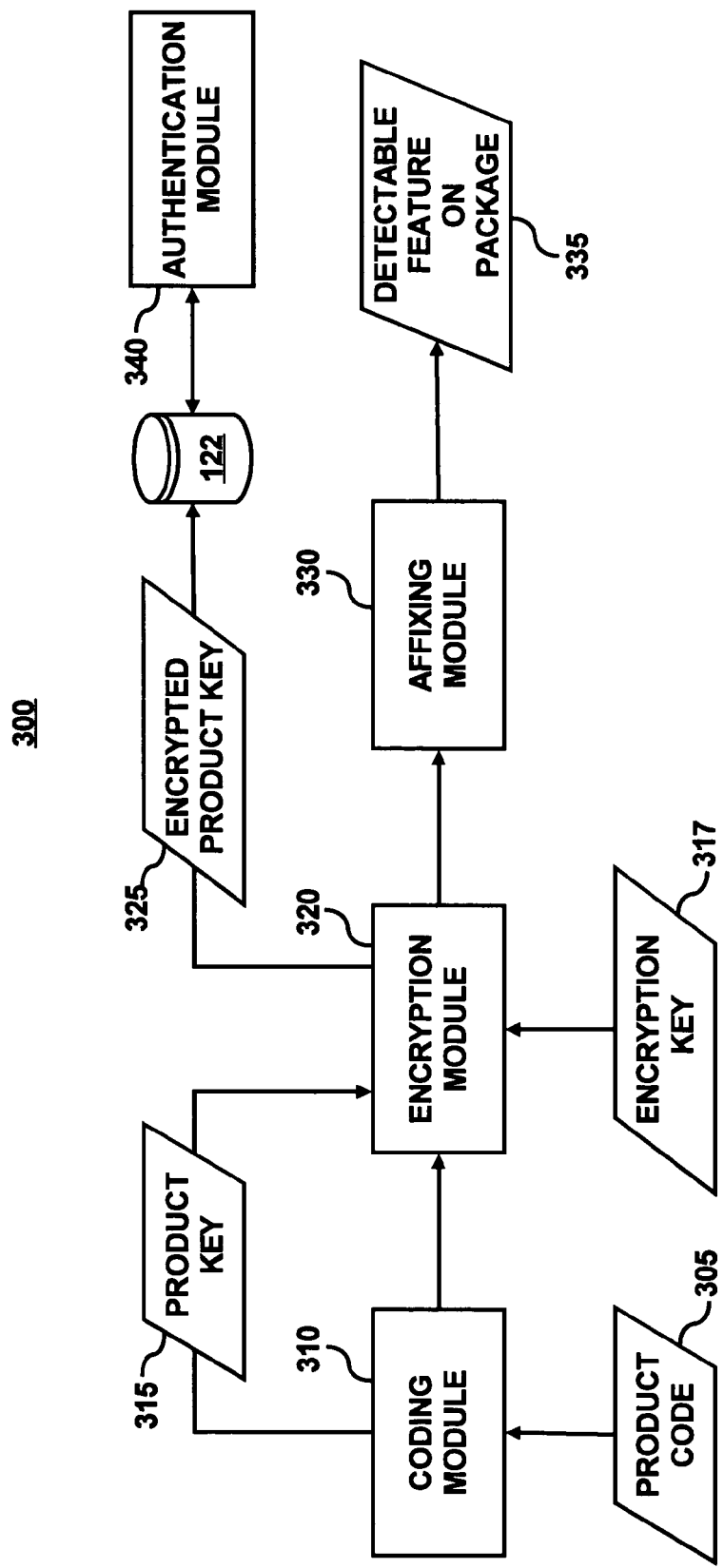
FIG. 3A illustrates data flow within an embodiment of an authentication system.

FIG. 3A illustrates a simplified example of data flow in a system 300 for authenticating products, including, but not limited to, pharma products. The system 300 may include a coding module 310, an encryption module 320, an affixing module 330 and an authentication module 340. The coding module 310, the encryption module 320 and the affixing module 330 may be located at the PMF 212 shown in FIG. 2. The authentication module 340 may be located at the PMF 212 or at an agent of the PMF 212. The authentication module 340 may be part of the server system 120 shown in FIG. 1.

At the coding module 310, the system 300 may generate a product key 315 derived from a product code 305 for each package. A product code may include any number that may identify a package, such as a lot number for the product or a unique number stored in a RFID tag. A product code can also be in the bar code or other RSS, reduced space symbology, the SKU, or stock-keeping unit. A product key can be any combination of these codes and/or hash/giest of these codes. As described above, a package may include a container, a carton or a pallet, where a carton includes 20-30 containers and a pallet includes about 500 or more cartons. A container may include a box or a bottle or any other type of receptacle or container for goods.

At the encryption module 320, the system 300 may encrypt the product key with an encryption key 317. The encryption key 317 may include a manufacturer key or a product line key. A manufacturer key may include a key that is assigned to a specific manufacturer for encrypting information for all of the packages for the manufacturer's products. A product line key may include a key that is specific to a product line of a manufacturer for encrypting information for all of the packages for the product line.

The encrypted product key 325 may be stored as a package identifier in a database 122 of a server system 130, shown in FIG. 1, for comparison during an authentication process. In some embodiments, information stored in a RFID tag is used in the encryption process. For example, since RFID may include 96 bits, this gives $2^{96}$ combinations for the RFID tag information. A subsample of these 96 bits may be used for encrypting the product key.

At the affixing module 330, the system 300 translates the results of the encryption process into detectable features, and affixes the detectable features on the package. For example, the encryption process in the encryption module 320 may produce an encrypted product key 325 that includes a bit stream. At the affixing module 330, the system 300 may be provided with a series of questions with which each package is to be authenticated. At the affixing module 330, the system 300 may align the questions with parts of the bit stream so that a part of the bit stream corresponds to each question. Thus, each part of a bit stream corresponding to a question may be translated by the printing module to an answer to the question. The answers to the questions are affixed on the package as detectable features on the package 335 at the affixing module 330. An example of a bit stream and corresponding detectable features are described with reference to FIG. 4A and FIG. 4B, below.

The authentication module 340, for example provided at the server system 120, receives identification information 347 from a user system 130, as shown in FIG. 3B. The identification information 347 may include a lot number or other unique identifier read from the package visually or electronically, such as using some type of a reader. The identification information 347 may also include responses to a series of questions presented to the user system 130 by the authentication module 340. In some embodiments, these questions can be made to carry from one lot to the next, so that spoofing of the system is made much more difficult. The user system 130 may submit the identification information 347 to the authentication module through a website. The website may be administered by the server system 120.

The authentication module 340 compares the received identification information to the stored encrypted product key 325. The authentication module 340 may also translate the responses to an authentication identifier that is similar in form to the stored encrypted product key(s) 325. For example, if the answer to a question is "yes," the part of the authentication identifier (stored separately from the package and accessed as described above) corresponding to the answer to the question may be set to "1" while if the answer to the question is "no," the part of authentication the identifier corresponding to the answer to the question may be set to "0." The authentication identifier may be compared to the stored encrypted product key 325 to determine whether the authentication identifier represents an authentic package. The authentication module 340 then transmits a message to the user system 130 indicating whether the package is authentic or not authentic.

FIG. 4A shows an example of an encrypted product key 325 in the form of a bit stream 400 produced by the encryption module 320. The bit stream 400 includes data representing answers to a series of questions regarding detectable features of a package to be authenticated. For example, the series of questions may include a question asking if there is a watermark on the label. The first section 402 of the bit stream, such as the first bit, may be set to be the answer to this question. As shown in FIG. 4, the first section 402 contains a value of "0." Thus, this indicates that a watermark or some other type of detectable mark (such as a printed image) should not be printed on the label.

Similarly, a second section 404 may represent, for example, color coding of the background of the ingredients list of the package. A third section may represent, for example, a number "Y" printed inside the cap of the bottle.

FIG. 4B illustrates an example of a package 420 having the detectable features derived from the bit stream 400 placed upon it. For example, the label 412 does not have a watermark as indicated in the first section 402 of the bit stream 400. A list of ingredients 414 includes the color coding derived from the second section 404 of the bit stream. The cap 416 includes the number "Y" derived from the third section 406 of the bit stream 400. The package 420 may also include a RFID tag 418 storing authentication data that may be read by the user system 130 and authenticated by the server system 120.

The RFID tag 418 uses radio frequency technology to transmit information stored in the RFID tag 418. For example, the RFID tag 418 may include an integrated circuit and an antenna. The RFID tag 418 preferably includes a passive RFID tag (not using an internal power source such as a battery). However, an active RFID tag (using an internal power source, such as a battery) may be used. The RFID tag 418 may be read by a RFID reader (not shown). The RFID reader may generate a magnetic field for interrogating the tag 418 using an antenna, which may include an inductive element. The magnetic field induces an energizing signal for powering the tag 418 via the antenna. When powered the RFID tag 418 generates a signal which may include information associated with the package 420. The signal is modulated using a know modulation scheme and transmitted to the RFID reader.

The RFID tag 418 may be read or written to from distances of up to 20 feet, and is not required to be in the line of sight of the RFID reader to be read. The RFID tag may be affixed onto the package 420 prior to, during, or after a process of printing information on the material used to form the package 420 or on material affixed to the package 420. The RFID tag can also be extricated from a series of RFID tags simultaneously polled from a pallet or other set of multiple RFID tagged units.

Figure 5:
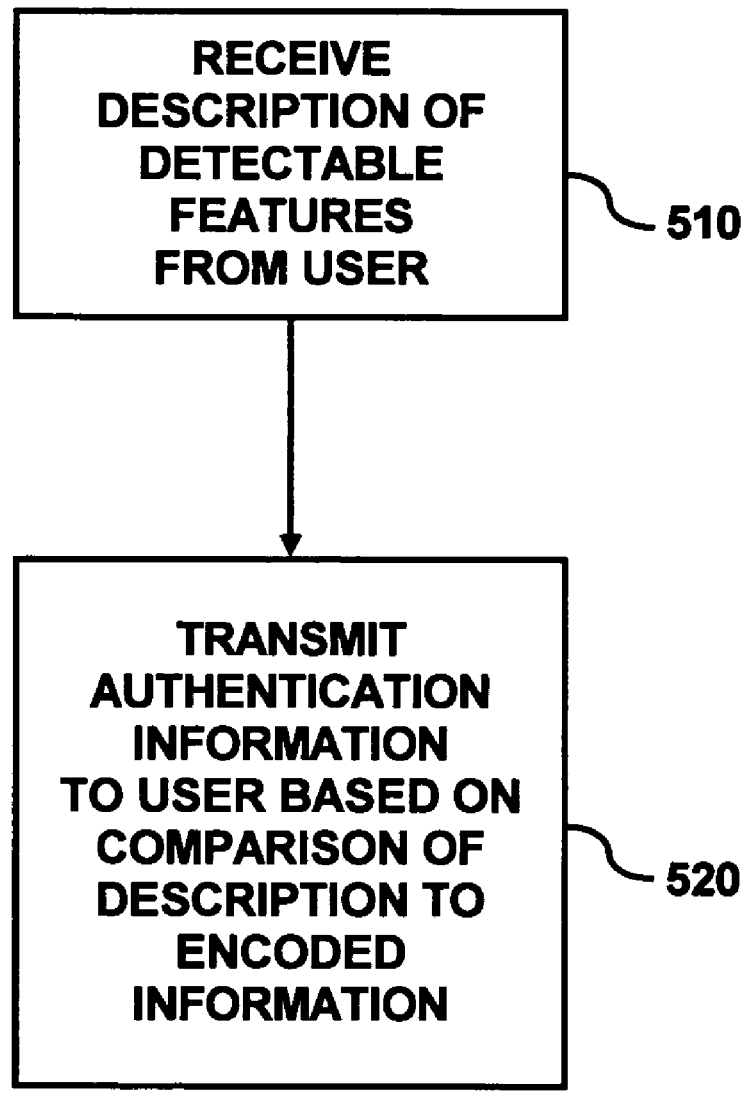
FIG. 5 illustrates an example of a method of authenticating a package.

FIG. 5 is a flow diagram illustrating an embodiment of a method of authenticating a package 420. The server system 120, as shown in FIG. 1, receives a description of the package from a user 230, shown in FIG. 2, at step 510. The server system 120 may receive the description, for example, through an authentication website. The user 230 may provide the description of the package from a user system 130 to the authentication module 340. In one embodiment, the user system 130 may transmit the description of the package over the network 110.

The description includes a description of detectable features 335 of the package, as described with respect to FIG. 3A. The detectable features 335 may be affixed on the package 420 based on encoded information. As discussed above with respect to FIGS. 3A, 3B, 4A and 4B, the encoded information may be derived from a unique product code 305 for the package 410. In one example, the product code 305 may include a lot number or a unique number store in the RFID tag 418. The RFID tag may also store numbers separate from the product code. For example, the RFID tag may include encrypted information.

The detectable features 335 may include any feature that may be printed or placed on the package. The detectable features 335 may be printed using variable data printing, where printing is varied per package based on data in the bit stream 400. Variations in the detectable features 335 may include one or more of a number placed somewhere on the package, variation in appearance of various features of the package, watermarks placed on the package, and placing various patterns or images on the package, colors, information stored in a RFID tag, etc.

Variations in appearance may include variations in color coding, resolution, line thickness, spacing, curvature, length, scale, number of line crossings, and so on. The number of line crossings may include the number of lines crossed by another line. The variations in appearance may also include the "warped" alphanumerics used for users to sign up for web-based lists, services etc., so that machines cannot automatically answer these questions and so on. The variations in appearance may be applied to an ingredients list or other words on the package such as using variable colored characters or different font sizes in text. Variations may be applied to a test target, such as a standard Macbeth color target, by printing a uniform hue rectangular target using differences in hue. Variations in test targets may also include variations in modulation transfer function ("MTF") patterns by printing MTF pattern sets with different low-resolution and high-resolution targets. Line thickness, spacing, percentage of colors in test targets may also be varied.

The description may include a description of the detectable features 335 affixed to the package 410. For example, the description may include a unique identification ("unique ID") such as a lot number, an identification number printed on the package, a name of the product, or a combination of any of the preceding. The description may also include answers to a series of questions or requests for answers from the server system 120. The series of questions may include questions regarding detectable features of the package 420 that is to be authenticated. For example, the questions may include questions regarding color coding, resolution, thickness, spacing, font size, patterns, watermarks, test targets, images, and/or numbers on the package. In some embodiments, the description received may include a scan of a RFID tag.

The server system 120 provides authentication information to the user system 130 based on comparison of the description received to stored package identifiers at step 520. Providing the authentication information may include providing an authentication message to the user system. The server system 120 may transmit the authentication message to the user system 130 over the network 110. In one embodiment, the server system 120 may provide an authentication message 345 based on a comparison of the received identification information 347 and stored package identifiers. The stored package identifiers may include, for example, encrypted product keys 325.

If the received identification information matches a stored package identifier, the server system 120 may provide a message to the user system 130 indicating that the received identification information 347 represents an authentic package. If the received identification information 347 does not match a stored package identifier, the server system 120 may provide a message to the user system 130 indicating that the received identification information does not represent an authentic package. The authentication message 345 may include an email or a message displayed on a web page viewable in a web browser of the user system 130, where the web page is part of a website administered by the server system 120.

The server system 120 may also purge package identifiers from the database 122 for packages including products which have expired. The server system 120 may purge each package identifier at the date of expiry of the product in the package to ensure that expired products are not authenticated by the server system 120. Expiry may also be reported to the user and recorded, since this gives a (different) clue to the type of counterfeiting involved than multiple authentication.

The server system 120 may also determine whether the package has already been authenticated. For example, the server system 120 may keep track of the number of times and/or by whom or what entity (such as "customer" or "pharmacist" or "warehouse") the package 410, as shown in FIG. 4B, has been authenticated. The server system 120 may also purge package identifiers if they have been authenticated by a customer. For example, the package identifiers authenticated by the customer may be purged from the list of "authentic, still to be authenticated" packages. Information that has already been "authenticated" may be reported and recorded, since it would provide a different type of counterfeiting provenance than expiry, described above.

Figure 6:
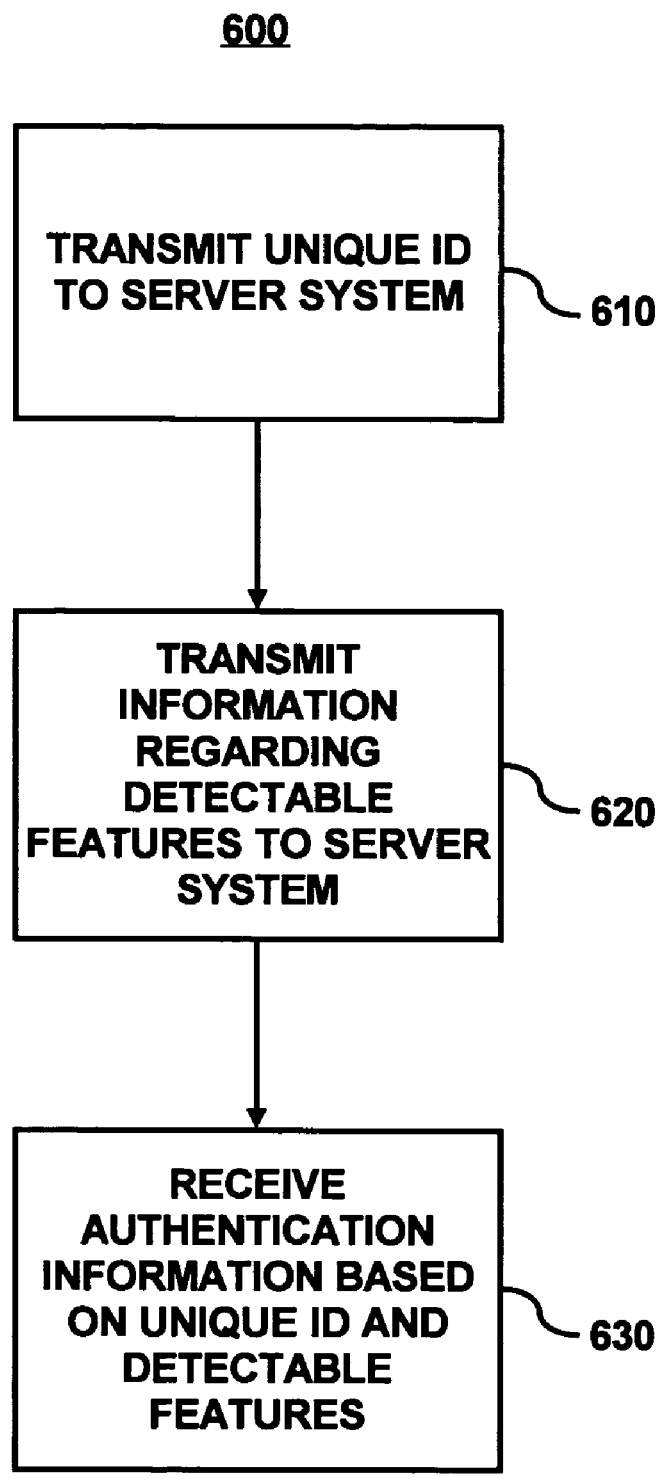
FIG. 6 illustrates an example of a method of checking authenticity of a package.

FIG. 6 is an embodiment of checking authenticity of a package. The user system 130, as shown in FIG. 1, provides a unique ID for a package 410, as shown in FIG. 4B, to a server system 130 to check authenticity of the package 410 at step 610. In one example, the user system 130 may submit the unique ID to the server system 120 through an authentication website administered by the server system 120. The unique ID may include a number printed on the package 420, a lot number for the package 420, or a combination of detectable identification found on the package 420 which a user 230, as shown in FIG. 2, may read and provide to the authentication website.

At step 620, the user system 130 provides information regarding detectable features of the package 410 to the server system 120. Detectable features may include detectable features such as the detectable features 412, 414, 416 shown in FIG. 4. The user 230 may provide descriptions of the detectable features 412, 414, 416 in response to a series of questions received from the authentication website.

The series of questions received from the authentication website may include questions regarding the detectable features of the package 420. The detectable features may include any feature that may be affixed on the package. The detectable features may be printed using variable data printing, where printing is varied per package based on data in the bit stream 400. Variations in the detectable features may include one or more of a number placed somewhere on the package, variation in appearance of various features of the package, watermarks placed on the package, and placing various patterns or images on the package, and so on.

Variations in appearance may include variations in color coding, resolution, line thickness, spacing, curvature, length, scale, number of line crossings, "warped" alphanumerics and so on. The variations in appearance may be applied to an ingredients list or other words on the package such as using variable colored characters or different font sizes in text. Variations may be applied to a test target, such as a standard Macbeth color target, by printing a uniform hue rectangular target using differences in hue. Variations in test targets may also include variations in modulation transfer function ("MTF") patterns by printing MTF pattern sets with different low-resolution and high-resolution targets. Line thickness, spacing, percentage of colors in test targets may also be varied.

The series of questions may include questions listed together on a web-based form or questions presented to the user 230 individually (one at a time). In some embodiments, each question that is presented individually to the user 230 may be dependent on a response transmitted by the user to a previous question. Depending on design, the response(s) by the user may be entered onto a blank line, selected from a drop down list, or selected from two or more radio buttons.

At step 620, the user 230 receives authentication information based on the unique ID of the package 420 and information regarding the detectable features of the package 420. For example, the user may receive an authentication message based on the transmitted unique ID and transmitted descriptions of the detectable features. If the combination of the transmitted unique ID and transmitted descriptions of the detectable features matches a stored package identifier, the user 230 may receive a message indicating that the combination of the transmitted unique ID and transmitted descriptions of the detectable features represents an authentic package. If the combination of the transmitted unique ID and transmitted descriptions of the detectable features does not match a stored package identifier, the user 230 may receive a message indicating that the combination of the transmitted unique ID and transmitted descriptions of the detectable features does not represent an authentic package.

The authentication message may include an email or a message displayed on a web page viewable in a web browser of the user system 130, where the web page is part of the authentication website administered by the server system 120.

Figure 7:
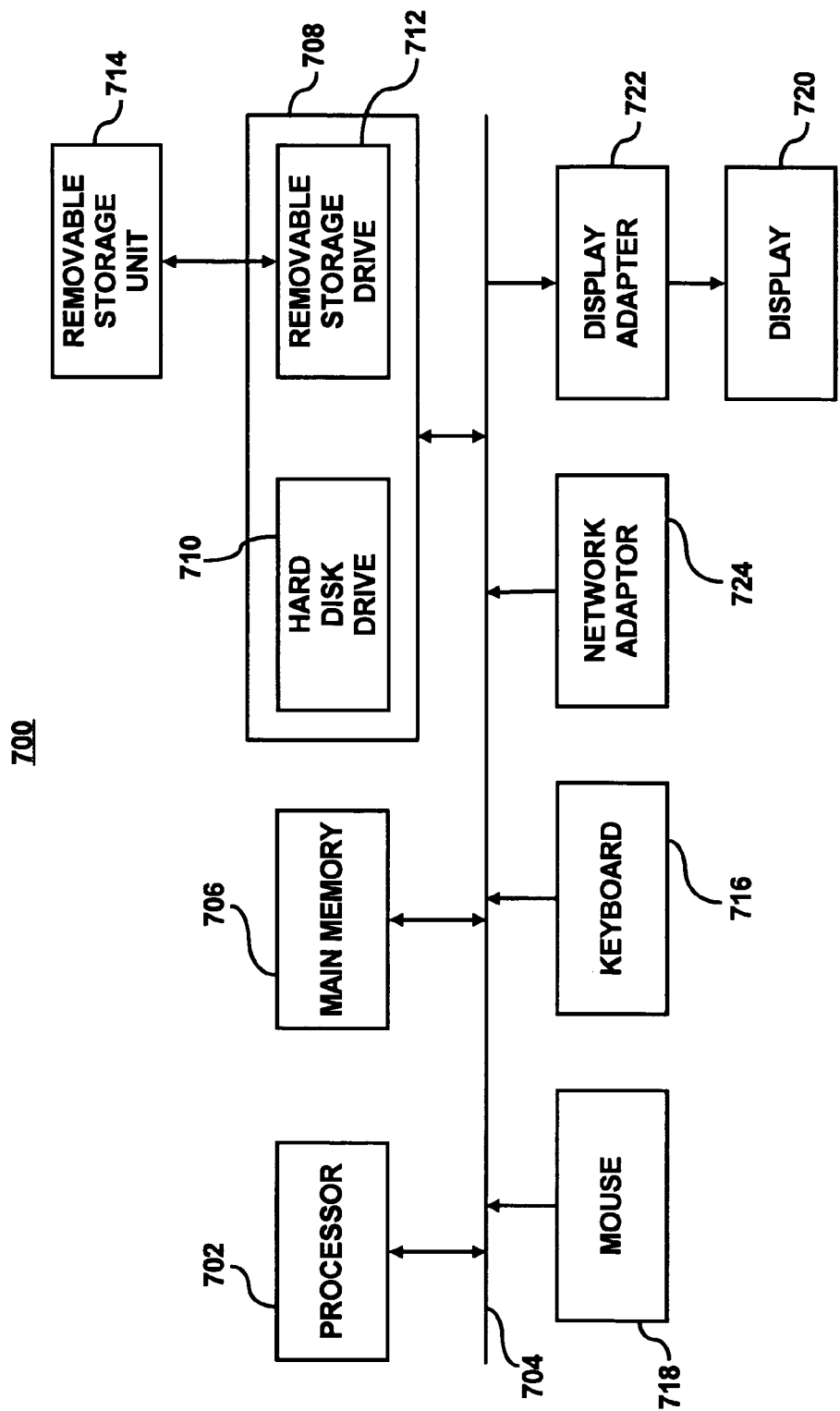
FIG. 7 is a block diagram illustrating a computer system operable to perform the method depicted in FIGS. 5 and 6.

FIG. 7 illustrates an embodiment of a computer system 700 operable to control the package authentication process described with respect to the methods 500 and 600. In this respect, the computer system 700 may be used as a platform for executing one or more of the functions described hereinabove with respect to the various steps outlined in the methods 500 and 600.

The computer system 700 includes one or more controllers, such as a processor 702. The processor 702 may be used to execute some or all of the steps described in the methods 500 and 600. Commands and data from the processor 702 are communicated over a communication bus 704. The computer system 700 also includes a main memory 706, such as a random access memory (RAM), where a program code may be executed during runtime, and a secondary memory 708. The secondary memory 708 includes, for example, one or more hard disk drives 710 and/or a removable storage drive 712, representing a floppy diskette drive, a magnetic tape drive, a compact disk drive, etc., where a copy of the program code for the method 400 may be stored.

The removable storage drive 712 reads from and/or writes to a removable storage unit 714 in a well-known manner. User input and output devices may include a keyboard 716, a mouse 718, and a display 720. A display adaptor 722 may interface with the communication bus 704 and the display 720 and may receive display data from the processor 702 and convert the display data into display commands for the display 720. In addition, the processor 702 may communicate over a network, for instance, the Internet, LAN, etc., through a network adaptor 724.

It will be apparent to one of ordinary skill in the art that other known electronic components may be added or substituted in the computer system 700. In addition, the computer system 700 may include a system board or blade used in a rack in a data center, a conventional "white box" server or computing device, etc. Also, one or more of the components in FIG. 7 may be optional (for instance, user input devices, secondary memory, etc.).

What has been described and illustrated herein is an embodiment along with some of its variations. The terms, descriptions and figures used herein are set forth by way of illustration only and are not meant as limitations. Those skilled in the art will recognize that many variations are possible within the spirit and scope of the subject matter, which is intended to be defined by the following claims—and their equivalents—in which all terms are meant in their broadest reasonable sense unless otherwise indicated.

What is claimed is:

1. A method of authenticating products, the method comprising:
  receiving a description of detectable features read from a package including two or more detectable features, wherein the detectable features are determined from encoded information associated with a product in the package and a series of questions regarding the package, and the detectable features are affixed to the package after being determined; and
  providing authentication information based on a comparison of the received description to one or more stored package identifiers.

2. The method of claim 1, further comprising:
  comparing the received description to the one or more stored package identifiers.

3. The method of claim 1, wherein receiving a description of one or more of the detectable features comprises receiving input transmitted from a reading device.

4. The method of claim 3, wherein receiving input from a reading device comprises receiving radio frequency identification ("RFID") tag information from the reading device.

5. The method of claim 1, further comprising affixing the detectable features on the package based on the encoded information.

6. The method of claim 1, wherein receiving a description of the package comprises a unique identification ("unique ID") associated with the package.

7. The method of claim 6, wherein the unique ID comprises at least one of a lot number, an identification number printed on the package, RFID tag information and a name of the product.

8. The method of claim 1, further comprising:
  providing one or more questions of the series of questions regarding the detectable features, wherein at least a portion of the received description is received in response to the one or more questions.

9. The method of claim 1, wherein providing the authentication message comprises providing a message indicating that the package is authentic if the received description matches one of the one or more stored package identifiers.

10. The method of claim 1, wherein providing the authentication message comprises providing a message indicating that the package may not be authentic if the received description does not match one of the one or more stored package identifiers.

11. The method of claim 1, further comprising removing at least one of the one or more stored package identifiers from a database in response to passing an expiration date associated with the at least one of the one or more stored package identifiers.

12. The method of claim 1 further comprising:
  generating a product key derived from a product code for the package; and
  encrypting the product key with one of a manufacturer key or a product line key to generate the encoded information.

13. The method of claim 12, wherein encrypting the product key produces a bit stream, and the method further comprises:
  translating the bit stream into answers to the series of questions regarding the package, the detectable features corresponding to the answers to the series of questions.

14. A method of authenticating a package, the method comprising:
  providing an unique ID of a package to a website;
  providing information regarding one or more detectable features of the package to the website, wherein the detectable features are determined from encoded information associated with a product in the package and a series of questions regarding the package, and the detectable features are affixed to the package after being determined; and
  receiving authentication information from the website regarding authenticity of the package.

15. The method of claim 14, wherein the unique ID comprises at least one of a lot number, an identification number printed on the package, RFID tag information and a name of the product.

16. The method of claim 14, wherein providing the information regarding the one or more detectable features comprises providing the information regarding the one or more detectable features in response to the series of questions received from the website.

17. A system for authenticating packages, the system comprising:
  an affixing module configured to affix detectable features on a package based on encoded information;
  an authentication module configured to receive a description of one or more of the detectable features and transmit authentication information based on a comparison of the received description to one or more stored package identifiers;
  an encoding module configured to generate a product key derived from a producer code for the package; and an encryption module configured to encrypt the product key with one of a manufacturer key or a product line key to produce a bit stream, wherein the affixing module is further configured to translate the bit stream into answers to a series of questions regarding the package, the detectable features corresponding to the answers to the series of questions.

18. A computer readable storage medium on which is embedded one or more computer programs, said one or more computer programs implementing a method of authenticating products, said one or more computer programs comprising a set of instructions for:

receiving a description of detectable features read from a package, wherein the detectable features are determined from encoded information associated with a product in the package and a series of questions regarding the package, and the detectable features are affixed to the package after being determined; and providing authentication information based on a comparison of the received description to one or more stored package identifiers.

19. A computer readable storage medium on which is embedded one or more computer programs, said one or more computer programs implementing a method of authenticating products, said one or more computer programs comprising a set of instructions for:

providing a unique ID of a package to a website;

providing information regarding one or more detectable features of the package to the website, wherein the detectable features are determined from encoded information associated with a product in the package and a series of questions regarding the package, and the detectable features are affixed to the package after being determined; and receiving authentication information from the website regarding authenticity of the package.

20. A system for authenticating a package, the system comprising:

means for receiving a description of detectable features read from a package, wherein the detectable features are determined from encoded information associated with a product in the package and a series of questions regarding the package, and the detectable features are affixed to the package after being determined; and means for providing authentication information based on a comparison of the received description to one or more stored package identifiers.

* * * * *

UNITED STATES PATENT AND TRADEMARK OFFICE
CERTIFICATE OF CORRECTION

| | |
|---|---|
| PATENT NO. | : 7,581,242 B1 |
| APPLICATION NO. | : 11/117797 |
| DATED | : August 25, 2009 |
| INVENTOR(S) | : Guillaume Oget et al. |

It is certified that error appears in the above-identified patent and that said Letters Patent is hereby corrected as shown below:

In column 10, line 38, in Claim 14, delete "an unique" and insert -- a unique --, therefor.

In column 10, line 67, in Claim 17, delete "producer" and insert -- product --, therefor.

Signed and Sealed this

Twelfth Day of October, 2010

David J. Kappos
*Director of the United States Patent and Trademark Office*